US009988162B2

(12) United States Patent
Cuilleron et al.

(10) Patent No.: US 9,988,162 B2
(45) Date of Patent: Jun. 5, 2018

(54) METHOD AND DEVICE FOR CONTROL OF A SUNLIGHT ACQUISITION PHASE OF A SPACECRAFT

(71) Applicant: AIRBUS DEFENCE AND SPACE SAS, Toulouse (FR)

(72) Inventors: Nicolas Cuilleron, Toulouse (FR); Jean Sperandei, Toulouse (FR); Philippe Laurens, Beauteville (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 133 days.

(21) Appl. No.: 15/039,018

(22) PCT Filed: Nov. 24, 2014

(86) PCT No.: PCT/EP2014/075419
§ 371 (c)(1),
(2) Date: May 24, 2016

(87) PCT Pub. No.: WO2015/075237
PCT Pub. Date: May 28, 2015

(65) Prior Publication Data
US 2017/0183108 A1     Jun. 29, 2017

(30) Foreign Application Priority Data

Nov. 25, 2013   (FR) ..................... 13 61581

(51) Int. Cl.
*B64G 1/28*     (2006.01)
*B64G 1/44*     (2006.01)
(Continued)

(52) U.S. Cl.
CPC ............. *B64G 1/443* (2013.01); *B64G 1/242* (2013.01); *B64G 1/283* (2013.01); *B64G 1/286* (2013.01); *B64G 1/405* (2013.01)

(58) Field of Classification Search
CPC .. B64G 1/443; B64G 1/242; B64G 2001/245; B64G 1/283; B64G 1/285; B64G 1/286; B64G 1/405
See application file for complete search history.

(56) References Cited

U.S. PATENT DOCUMENTS 5,312,073 A * 5/1994 Flament ................... B64G 1/24
                                                                  136/292
5,535,965 A   7/1996 Surauer et al.
(Continued)

FOREIGN PATENT DOCUMENTS

EP    0 394 897 A1   10/1990
EP    0 788 045 A1   8/1997

*Primary Examiner* — Philip J Bonzell
(74) *Attorney, Agent, or Firm* — Im IP Law; C. Andrew Im

(57) ABSTRACT

A method to control a sunlight acquisition phase of a spacecraft with a nonzero angular momentum of an axis $D_H$. The spacecraft includes a solar generator configured to rotate about an axis Y. The spacecraft actuators are controlled to place the spacecraft in an intermediate orientation in which the axis Y is substantially orthogonal to the axis $D_H$. The solar generator is controlled to orientate the solar generator towards the sun. The spacecraft actuators are controlled to reduce the angular momentum of the spacecraft. The actuators of the spacecraft engine are controlled to place the spacecraft in an acquisition orientation in which the axis Y is substantially orthogonal to the direction of the sun with respect to the spacecraft.

18 Claims, 2 Drawing Sheets

(51) Int. Cl.
*B64G 1/40* (2006.01)
*B64G 1/24* (2006.01)

(56) References Cited

U.S. PATENT DOCUMENTS

| | | | |
|---|---|---|---|
| 5,558,305 A | | 9/1996 | Surauer et al. |
| 5,626,315 A | * | 5/1997 | Flament ................... B64G 1/24 244/168 |
| 5,788,188 A | * | 8/1998 | Damilano ................ B64G 1/24 244/164 |
| 5,850,992 A | * | 12/1998 | Flament ................... B64G 1/24 244/168 |
| 6,032,904 A | * | 3/2000 | Hosick ..................... B64G 1/26 244/169 |
| 6,382,565 B1 | | 5/2002 | Fowell |
| 9,027,887 B2 | * | 5/2015 | Polle ........................ B64G 1/26 244/158.6 |
| 9,045,241 B2 | * | 6/2015 | Caullier ................... B64G 1/288 |
| 2014/0032022 A1 | * | 1/2014 | Caullier ................... B64G 1/288 701/13 |
| 2015/0001345 A1 | * | 1/2015 | Polle ........................ B64G 1/26 244/158.6 |

* cited by examiner

METHOD AND DEVICE FOR CONTROL OF A SUNLIGHT ACQUISITION PHASE OF A SPACECRAFT

RELATED APPLICATIONS

This application is a § 371 application from PCT/EP2014/075419 filed Nov. 24, 2014, which claims priority from French Patent Application No. 13 61581 filed Nov. 25, 2013, each of which is incorporated herein by reference in its entirety.

TECHNICAL FIELD

The present invention belongs to the field of the control of spacecraft, and more particularly relates to a method and a device for controlling a phase of acquisition of the Sun by a spacecraft comprising at least one solar generator which can be moved about an axis Y.

A "Sun acquisition phase" is intended to mean a phase during which the spacecraft is controlled so as to place said spacecraft in an acquisition orientation in which the axis Y is substantially orthogonal to the direction $D_S$ of the Sun with respect to the spacecraft. In this acquisition orientation, the solar generator can be directed toward the Sun, the rays of which then have a normal incidence on said solar generator.

BACKGROUND OF THE INVENTION

A Sun acquisition phase is for example carried out by a spacecraft, such as a satellite, after separation from a launcher of said satellite. Such a Sun acquisition phase is referred to in the rest of the description as an "initial Sun acquisition phase".

Specifically, after separation from the launcher, the satellite is autonomous and needs to ensure its electrical autonomy by trying to point its solar generators toward the Sun in order to provide electrical power to a platform of said satellite and in order to recharge the batteries of said satellite. Conventionally, the batteries are charged before the satellite is released, and, after separation and before the solar generators are deployed and are directed toward the Sun, the electrical power necessary for the operation of the platform of the satellite is provided by said batteries.

This initial Sun acquisition phase is made difficult by the fact that, at the time of separation from the launcher, the satellite may be released with a high rotational speed: typically up to 3°/s in an LEO orbit ("Low Earth Orbit") and of the order of 1°/s in a GEO orbit ("Geostationary Orbit"). The initial Sun acquisition phase therefore comprises a step of reducing the rotational speed of the satellite. This reduction of the rotational speed of the satellite needs to be short so as not to risk fully discharging the batteries of said satellite.

Thus, the satellite comprises actuators used in order to reduce the angular momentum of the satellite after separation from the launcher.

It is in particular known, for satellites in an LEO orbit, to employ magnetic torquers using the Earth's magnetic field in order to form torques capable of reducing the angular momentum of the satellite. For satellites in an MEO ("Medium Earth Orbit") or GEO (or GTO—"Geostationary Transfer Orbit") orbit, for which the Earth's magnetic field is negligible, chemical thrusters are generally used. Such chemical thrusters are advantageous in that they can be used immediately after separation from the launcher, in that they do not require a high electrical power, and in that they can apply large torques to the satellite, which makes it possible to reduce the angular momentum and to place the satellite in the acquisition orientation in a very short time (of the order of a few minutes).

After the angular momentum of the satellite has been reduced sufficiently and the satellite has been placed in the acquisition orientation, the solar generators are deployed and directed toward the Sun in order to supply the platform of said satellite and recharge the batteries.

It is currently envisioned that future satellites will no longer be equipped with chemical thrusters, but only with electrical (plasma) thrusters. The initial Sun acquisition phase would then become problematic, particularly for satellites in an MEO/GEO/GTO orbit, because electrical thrusters cannot replace chemical thrusters for reduction of the angular momentum of the satellite after separation.

This is because electrical thrusters cannot be used during the first days following separation from the launcher. Furthermore, the thrusters require a high electrical power (of the order of a few kW) and can only apply low torques to the satellite (of the order of 0.2 N·m). Consequently, reducing the angular momentum of the satellite by means of electrical thrusters would require a high electrical power for a long time, which is incompatible with the batteries installed in current satellites, which have a capacity of the order of 10 kW·h. Such a capacity makes it possible to supply the electrical thrusters for only about one hour, which is insufficient to reduce the angular momentum of the satellite sufficiently in view of the torques which can be formed by current electrical thrusters.

Current satellites are generally equipped with electrical inertial actuators, such as flywheels (reaction wheels, gyroscopic actuators), which are used in order to control the attitude of said satellite along three axes. Such inertial actuators generally have an insufficient capacity to compensate on their own for the angular momentum of the satellite after separation, but may be used after the other actuators (magnetic torquers, chemical thrusters, etc.) have reduced said angular momentum of said satellite sufficiently.

One alternative might consist in dimensioning the electrical inertial actuators so that they have a capacity to compensate on their own for the angular momentum of the satellite after separation. This, however, would lead to a significant increase of the mass and the volume of said inertial actuators. By way of example, the initial angular momentum of a satellite after release may be of the order of from 500 N·m·s to 1000 N·m·s, while the capacity of the inertial actuators installed in a satellite is generally of the order of from 50 N·m·s to 100 N·m·s. Furthermore, even though the inertial actuators might be dimensioned so as to have a capacity of 1000 N·m·s, particularly unfavorable separation conditions could still transfer an initial angular momentum of more than 1000 N·m·s to the satellite, which is beyond the capacity of the inertial actuators.

It should be noted that the Sun acquisition phase may also be carried out when the satellite is in survival mode. The comments above remain valid for such a Sun acquisition phase in survival mode.

SUMMARY OF THE INVENTION

The object of the present invention is to overcome all or some of the limitations of the prior art solutions, in particular those explained above, by providing a Sun acquisition phase which can be carried out even by spacecraft not having chemical thrusters.

To this end, according to a first aspect, the invention relates to a method for controlling a phase of acquisition of the Sun by a spacecraft with a nonzero angular momentum of axis $D_H$, said spacecraft comprising a body, a solar generator and a mechanism for driving said solar generator in rotation about an axis Y. According to the invention, the control method comprises steps of:

- controlling actuators of the spacecraft so as to place said spacecraft in an intermediate orientation with respect to the angular momentum, in which the axis Y is substantially orthogonal to the axis $D_H$ of the angular momentum,
- controlling the drive mechanism of the solar generator, at least partially deployed beforehand, so as to orientate said solar generator toward the Sun,
- controlling actuators of the spacecraft so as to reduce the angular momentum of said spacecraft,
- controlling actuators of the spacecraft so as to place said spacecraft in an acquisition orientation with respect to the Sun, in which the axis Y is substantially orthogonal to the direction $D_S$ of the Sun with respect to the spacecraft.

The intermediate orientation of the spacecraft makes it possible to ensure that there is always an orientation of the solar generator making it possible to ensure electrical autonomy of said spacecraft. By deploying the solar generator at least partially before reducing all or some of the angular momentum of the spacecraft, constraints associated with the electrical autonomy of the spacecraft are relaxed. Said angular momentum reduction may, in particular, be spread over time and/or use electrical actuators.

In particular embodiments, the method for controlling a Sun acquisition phase may furthermore have one or more of the following characteristics, taken individually or in any technically feasible combinations.

In one particular embodiment, the placement of the spacecraft in the intermediate orientation uses inertial actuators of said spacecraft, preferably gyroscopic actuators and/or reaction wheels.

In one particular embodiment, the placement of the spacecraft in the acquisition orientation uses inertial actuators of said spacecraft, preferably gyroscopic actuators and/or reaction wheels.

In one particular embodiment, the inertial actuators are used, in order to place the spacecraft in the acquisition orientation, when the angular momentum of the spacecraft becomes less than a predefined threshold value.

In one preferred embodiment, the reduction of the angular momentum of the spacecraft placed in the intermediate orientation beforehand uses electrical thrusters of said spacecraft.

In one particular embodiment, only electrical actuators are used during the Sun acquisition phase.

In one particular embodiment, the axis of maximum inertia of the spacecraft being orthogonal to the axis Y when the solar generator of said spacecraft is deployed, the solar generator is at least partially deployed prior to the placement of the spacecraft in the intermediate orientation, and nutation damping is carried out during the placement of said spacecraft in said intermediate orientation.

In one particular embodiment, the axis of minimum inertia of the spacecraft being orthogonal to the axis Y, nutation control aiming to align the axis of minimum inertia of said satellite with the axis $D_H$ of the angular momentum is carried out during the placement of the spacecraft in the intermediate orientation.

In one particular embodiment, the orientation of the solar generator during the reduction of the angular momentum is determined as a function of the angle, referred to as the "offset angle θ", between the direction $D_S$ of the Sun and the axis $D_H$ of the angular momentum.

In one particular embodiment, the orientation of the solar generator is kept fixed with respect to the body of the spacecraft during the reduction of the angular momentum.

In one particular embodiment, the solar generator is maintained during the reduction of the angular momentum in such a way that a photosensitive surface of said solar generator is:

- substantially parallel to the axis $D_H$ of the angular momentum when $|\cos θ| < V_{S1}$, $V_{S1}$ being a predefined threshold value,
- substantially orthogonal to the axis $D_H$ when $|\cos θ| > V_{S1}$, said photosensitive surface being oriented toward the side facing the Sun.

In one particular embodiment, the spacecraft comprising two solar generators mounted on respective drive mechanisms capable of rotating said solar generators about respective parallel axes Y, said solar generators are maintained during the reduction of the angular momentum in such a way that the respective photosensitive surfaces of said solar generators are substantially parallel to the axis $D_H$ of the angular momentum and with opposite respective pointing directions when $|\cos θ| < V_{S2}$, $V_{S2}$ being a predefined threshold value.

In one particular embodiment, the phase of acquisition of the Sun by the spacecraft is remotely controlled by a control device, control signals being successively determined and sent to the spacecraft by said control device.

According to a second aspect, the invention relates to a computer program product comprising a set of program code instructions which, when they are executed by a processor, carry out a method for controlling a phase of acquisition of the Sun by a spacecraft according to any one of the embodiments of the invention.

According to a third aspect, the invention relates to a device for controlling a phase of acquisition of the Sun by a spacecraft with a nonzero angular momentum of axis $D_H$, said spacecraft comprising a body, actuators, a solar generator and a mechanism for driving said solar generator in rotation about an axis Y, said control device comprising means configured in order to control the phase of acquisition of the Sun according to any one of the embodiments of the invention.

According to a fourth aspect, the invention relates to a space system comprising a spacecraft comprising a body, actuators, a solar generator and a mechanism for driving said solar generator in rotation about an axis Y, said system furthermore comprising a device for controlling a phase of acquisition of the Sun by said spacecraft according to any one of the embodiments of the invention.

In one preferred embodiment, the spacecraft does not have any chemical thrusters.

DESCRIPTION OF THE FIGURES

The invention will be understood more clearly on reading the following description, which is given by way of entirely nonlimiting example and is provided with reference to the figures, in which.

In these figures, references which are the same from one figure to another denote elements which are the same or similar. For reasons of clarity, the elements represented are not to scale, unless otherwise mentioned.

DETAILED DESCRIPTION OF EMBODIMENTS

The present invention relates to the phases of acquisition of the Sun by a spacecraft comprising at least one solar generator which can be moved about an axis Y of the spacecraft.

A "Sun acquisition phase" is intended to mean a phase during which the spacecraft is controlled so as to place said spacecraft in an acquisition orientation in which the axis Y is substantially orthogonal to the direction $D_S$ of the Sun with respect to the spacecraft. In particular, the present invention has a particularly advantageous application in the case of an initial phase of acquisition of the Sun by the spacecraft (immediately after separation from a launcher of the spacecraft), or alternatively a Sun acquisition phase in survival mode of the spacecraft.

In the rest of the description, without limitation the case will be assumed in which the spacecraft is a satellite 10, and the case of an initial phase of acquisition of the Sun by the spacecraft 10. It should furthermore be noted that the invention is applicable regardless of the orbit, LEO, MEO, GEO, etc., on which the satellite 10 is intended to carry out its mission. The present invention has a particularly advantageous application in particular in the case of a satellite 10 placed in a GTO orbit by a launcher and intended to carry out its mission in a GEO orbit.

Figure 1:
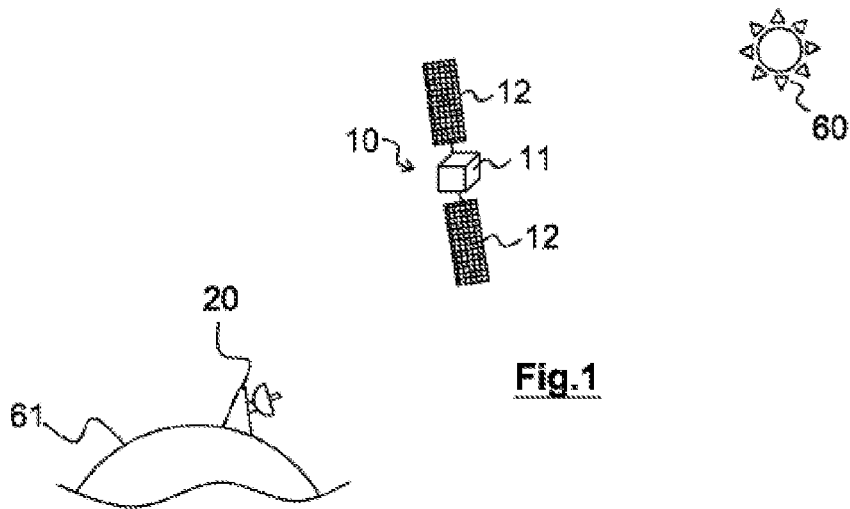
FIG. 1 represents a schematic representation of a space system comprising a spacecraft which needs to carry out a Sun acquisition phase.

FIG. 1 schematically represents a space system comprising a satellite 10 which needs to carry out an initial phase of acquisition of the Sun 60 after separation from a launcher (not represented in the figures).

As illustrated by FIG. 1, the satellite 10 comprises a body 11 and two solar generators 12, on either side of the body 11, as well as a set of actuators (not represented in the figures) capable of controlling the orbit of the satellite and of controlling the attitude of the satellite, preferably along three axes.

The solar generators 12 comprise respective photosensitive surfaces, which are for example planar, and which generate electrical power when they are directed toward the Sun. In order to control the orientation of said photosensitive surfaces with respect to the Sun, the solar generators 12 can be moved in rotation about the same axis Y, about which said solar generators 12 are driven by respective drive mechanisms.

It should be noted that the solar generators 12 are represented as being deployed in FIG. 1, but that said solar generators 12 are generally folded immediately after separation from the launcher. Furthermore, the satellite 10 illustrated in FIG. 1 comprises two solar generators 12, although the invention is applicable so long as said satellite 10 comprises at least one solar generator 12 which can be moved in rotation about an axis Y.

The space system also comprises a device 20 for controlling the initial phase of acquisition of the Sun 60 by the satellite 10. In the nonlimiting example illustrated by FIG. 1, the control device 20 is remote from the satellite 10, and corresponds to a ground station on the surface of the Earth 61.

More generally, the control device 20 may be installed in the satellite 10 or in one or more equipment items remote from said satellite 10. According to other examples, there is furthermore nothing to exclude there being a control device 20 distributed between the satellite 10 and one or more equipment items remote from said satellite 10.

In the example illustrated by FIG. 1, the control device 20 therefore remotely controls the initial phase of acquisition of the Sun by the satellite 10, and to this end the control device 20 and the satellite 10 comprise respective conventional telecommunication means.

The control device 20 is capable of determining signals for controlling the initial Sun acquisition phase, which are sent to the satellite 10. Said control signals are, for example, determined as a function of measurement signals received from the satellite 10, which are determined by various sensors (gyroscope, gyrometer, accelerometer, stellar sensor, etc.) of said satellite 10.

The control device 20 comprises, for example, at least one processor and at least one electronic memory in which a computer program product is stored in the form of a set of program code instructions to be executed in order to carry out the various steps of a control method 50. In one variant, the control device 20 also comprises one or more programmable logic circuits of the FPGA, PLD etc., type, and/or specialized integrated circuits (ASICs) capable of carrying out all or some of said steps of the control method 50.

In other words, the control device 20 comprises a set of means configured in software fashion (specific computer program product) and/or hardware fashion (FPGA, PLD, ASIC, etc.) for carrying out the various steps of a control method 50 as described below.

Figure 2:
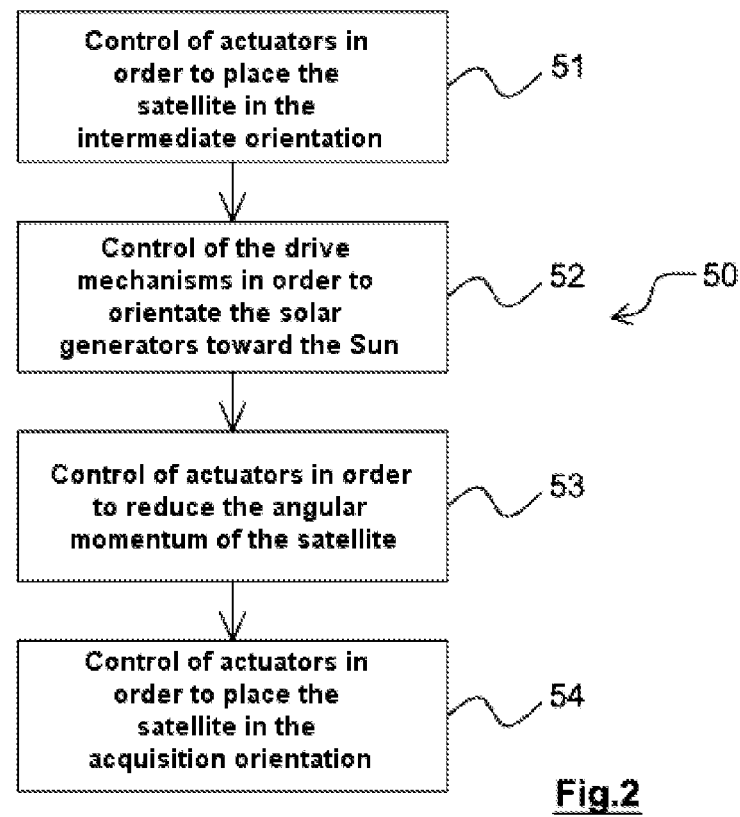
FIG. 2 represents a diagram illustrating the main steps of a method for controlling a Sun acquisition phase.

FIG. 2 represents the main steps of a method 50 for controlling an initial phase of acquisition of the Sun by the satellite 10, said satellite 10 having, immediately after separation from the launcher, a nonzero angular momentum of which the axis $D_H$ can be estimated by means of suitable conventional sensors (gyroscope, stellar sensor, etc.).

As illustrated by FIG. 2, the main steps of a control method 50 according to the invention are:

51 controlling actuators of the satellite 10 so as to place said satellite 10 in an intermediate orientation with respect to the angular momentum, corresponding to an orientation of said satellite 10 in which the axis Y of rotation of the solar generators 12 is substantially orthogonal to the axis $D_H$ of the angular momentum, 52 controlling the drive mechanism of the solar generators 12, at least partially deployed beforehand, so as to orientate said solar generators toward the Sun.

An "at least partially deployed solar generator" is intended to mean that at least a part of the photosensitive surface of said solar generator both can be moved in rotation about the axis Y and is available to generate electrical power. For example, if the photosensitive surface of a solar generator is distributed over a plurality of panels that are initially folded on one another, said solar generator may optionally be deployed progressively by successively unfolding the various panels.

After the satellite 10 has been placed in the intermediate orientation and after the at least partially deployed solar generators 12 have been oriented toward the Sun, the control method 50 comprises steps of:

53 controlling actuators of the satellite 10 so as to reduce the angular momentum of said satellite 10, 54 controlling actuators of the satellite 10 so as to place said satellite 10 in an acquisition orientation with respect to the Sun, corresponding to an orientation of said satellite 10 in which the axis Y is substantially orthogonal to the direction $D_S$ of the Sun with respect to said satellite 10.

Placement of the Satellite in the Intermediate Orientation

During the step 51 of placing the satellite 10 in the intermediate orientation, an attempt is not necessarily made to modify the angular momentum of the satellite 10 in an inertial reference frame, but rather to modify the orientation of said satellite 10 with respect to the axis $D_H$ of said angular momentum so as to make the axis Y substantially orthogonal to the axis $D_H$.

It should be noted that "substantially orthogonal" is intended to mean here that the setpoint angle β between the elements being compared (the axis Y and the axis $D_H$ in the case above) is such that |sin β|>0.9. It should, however, be noted that the case in which the setpoint angle β is such that |sin β|=1 (setpoint angle aiming to obtain elements which are strictly orthogonal to within errors) corresponds to a preferred embodiment. Similarly, in the rest of the description "substantially parallel" is intended to mean that the setpoint angle β between the elements being compared is such that |cos β|>0.9, the case in which the setpoint angle β is such that |cos β|=1 (setpoint angle aiming to obtain elements which are strictly parallel to within errors) then corresponding to a preferred embodiment.

It should be noted that the initial angular momentum (including the axis $D_H$) is in principle inertial, that is to say invariant in the absence of external torques on the satellite 10. Thus, once the satellite 10 has been placed in the intermediate orientation, it is not in principle necessary to update said intermediate orientation. In the case in which the initial angular momentum is not inertial, it is then advantageous, if the axis $D_H$ varies greatly, to update the intermediate orientation of the satellite 10 in order to follow the variations of the axis $D_H$ and to keep the axis Y substantially orthogonal to the axis $D_H$ of the angular momentum.

For example, if the axis Y corresponds to the axis of minimum inertia of the satellite 10, then the placement of the satellite 10 in the intermediate orientation consists in aligning the axis of minimum inertia of said satellite 10 with the axis $D_H$ of the angular momentum. For the person skilled in the art, this corresponds to a forced transition into "flat spin" by damping the nutation of the satellite 10 with respect to the axis $D_H$ of the angular momentum. If necessary, the solar generators 12 may be at least partially deployed during or prior to the placement of the satellite 10 in the intermediate orientation, in order to ensure that the axis Y is indeed the axis of minimum inertia of said satellite 10.

More generally, the axis Y is not necessarily the axis of minimum inertia of the satellite 10. For example, if the axis Y is the axis of maximum inertia, then the placement of the satellite 10 in the intermediate orientation consists in aligning the axis of minimum inertia of said satellite 10 with the axis $D_H$ of the angular momentum, by suitable control of the nutation of said satellite 10 with respect to the axis $D_H$ of said satellite 10.

Such a modification of the orientation of the satellite 10 with respect to the axis $D_H$ may be carried out independently of the angular momentum, by any type of suitable actuator (chemical or electrical), including by inertial actuators of which the capacity is less than said angular momentum.

In one preferred embodiment, the placement of the satellite 10 in the intermediate orientation is carried out by means of inertial actuators of said satellite 10, such as gyroscopic actuators and/or reaction wheels of said satellite 10. The control of said inertial actuators, in order to control the nutation of the satellite 10 (alignment of the axis $D_H$ with the axis of maximum inertia or with the axis of minimum inertia of said satellite 10) may employ methods known to the person skilled in the art, for example the method described in U.S. Pat. No. 6,382,565.

Orientation of the Solar Generators

When the satellite 10 is placed in the intermediate orientation, the solar generators 12, at least partially deployed beforehand, are oriented toward the Sun. Here, "oriented toward the Sun" is intended to mean that said solar generators 12 are placed in respective orientations making it possible to optimize the insolation of the photosensitive surfaces of said solar generators 12 over the period of one full rotation of the satellite 10 on itself. For example, the at least partially deployed solar generators 12 are placed in respective orientations making it possible to ensure that the average insolation of the photosensitive surfaces of said solar generators 12 over the period of one full rotation of the satellite on itself is greater than a predefined threshold value.

As indicated above, in the intermediate orientation the axis Y of rotation of the solar generators 12 is substantially orthogonal to the axis $D_H$ of the angular momentum. Such an orientation of the satellite 10 is particularly advantageous in that although the attitude of the satellite 10 is not stabilized along three axes, it is nevertheless still possible to find respective orientations of the solar generators 12 making it possible to ensure electrical autonomy of the satellite 10, as described below.

The respective orientations of the solar generators 12 are, for example, determined as a function of the angle, referred to as the "offset angle θ", between the direction $D_S$ of the Sun and the axis $D_H$ of the angular momentum.

The orientations of the solar generators 12 are, for example, kept fixed so long as the axis $D_H$ of the angular momentum does not vary, which makes it possible to have simple control of the solar generators 12 and to limit the use of the drive mechanisms until the angular momentum of the satellite has been reduced. According to other examples, however, there is nothing to exclude making the respective orientations of the solar generators 12 vary in the course of time, even if the axis $D_H$ does not vary, in order to take into account the rotation of the satellite 10, for example so as to maximize the instantaneous insolation of the photosensitive surface of at least one solar generator 12.

In the rest of the description, without limitation, the case will be assumed in which the orientation of the solar generators 12 is kept fixed so long as the axis $D_H$ of the angular momentum does not vary.

The "pointing direction" of the photosensitive surface of a solar generator 12 denotes a vector normal to said photosensitive surface, oriented toward the side of said solar generator 12 on which the Sun should lie in order to generate electrical power.

In one particular embodiment, the solar generators are maintained during the reduction of the angular momentum in such a way that the pointing direction of the photosensitive surface of each solar generator 12 is:

substantially orthogonal to the axis $D_H$ of the angular momentum (in other words, said photosensitive surface is substantially parallel to the axis $D_H$) when |cos θ|<$V_{S1}$, $V_{S1}$ being a predefined threshold value, preferably lying between 0.3 and 0.6, substantially parallel to the axis $D_H$ (in other words, said photosensitive surface is substantially orthogonal to the axis $D_H$) when $|\cos \theta| > V_{S1}$, said photosensitive surface being oriented toward the side facing the Sun.

Figure 3:
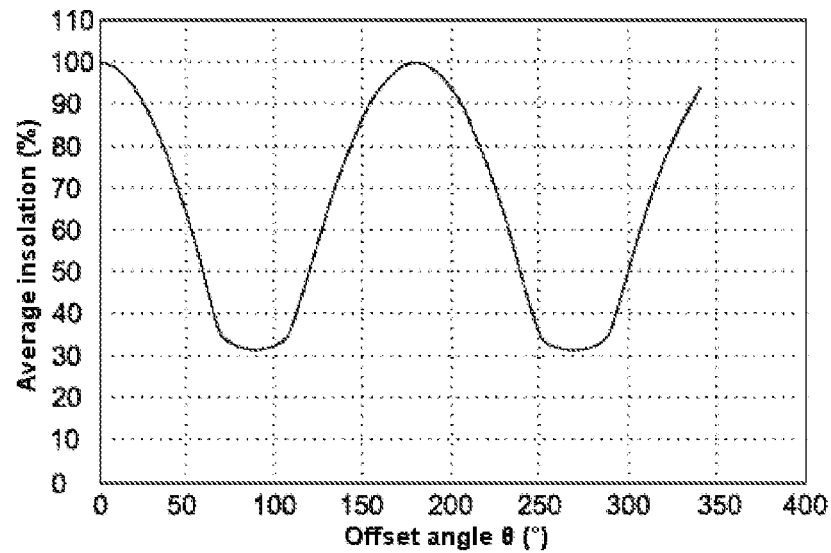
FIG. 3 represents a curve representing the average insolation of solar generators of a spacecraft placed in an intermediate orientation during a Sun acquisition phase.

FIG. 3 represents the average insolation obtained, as a function of the offset angle θ, over the period of one full rotation of the satellite 10 on itself, assuming the threshold value $V_{S1}$ to be equal to approximately 0.34 and assuming the axis Y and the axis $D_H$ to be strictly orthogonal.

With such control of the solar generators 12 when the satellite 10 is in the intermediate orientation, the average insolation of the photosensitive surfaces of the solar generators 12 depends only on the offset angle θ.

In particular, when $|\cos \theta| > V_{S1}$, the average insolation of said photosensitive surfaces varies as $|\cos \theta|$ (each photosensitive surface being substantially orthogonal to the axis $D_H$, the offset angle θ then corresponds to the difference of the angle of incidence of the rays of the Sun on the photosensitive surfaces from normal incidence). Furthermore, it is found that the average insolation of the photosensitive surfaces of the solar generators 12 is always more than 30%.

The average insolation of the photosensitive surfaces of the solar generators 12 will most often be less than the optimal insolation which can be obtained when the satellite 10 is in the acquisition orientation. Such average insolation is, however, sufficient to ensure electrical autonomy of the satellite 10 insofar as it is still possible to recharge the batteries of said satellite 10, if necessary by deactivating the equipment which consumes the most electrical power.

In one preferred embodiment, said solar generators 12 are maintained during the reduction of the angular momentum in such a way that the respective photosensitive surfaces of said solar generators 12 are substantially parallel to the axis $D_H$ of the angular momentum and with opposite respective pointing directions when $|\cos \theta| < V_{S2}$, $V_{S2}$ being a predefined threshold value. The threshold value $V_{S2}$ preferably lies between 0.1 and 0.6, or even between 0.3 and 0.6. In particular embodiments, the threshold values $V_{S1}$ and $V_{S2}$ are equal.

Assuming, for example, that the axis $D_H$ of the angular momentum is orthogonal to the direction $D_S$ of the Sun ($|\cos \theta| = 0$), because the respective pointing directions of the photosensitive surfaces are opposite there is always a photosensitive surface oriented toward the side facing the Sun and a photosensitive surfaces oriented toward the side facing away from the Sun. If, conversely, the photosensitive surfaces of the solar generators 12 were oriented toward the same side of the satellite 10, the two photosensitive surfaces would simultaneously be:

both oriented toward the side facing the Sun during half the period of the full rotation of the satellite 10 on itself,
both oriented toward the side facing away from the Sun during half the period of said full rotation.

Such arrangements consequently make it possible to limit the variations of the instantaneous insolation of the solar generators 12 around the average insolation over the period of one full rotation of the satellite 10 on itself.

It should be noted that the deployment of the solar generators 12 may be carried out before, during or after the placement of the satellite 10 in the intermediate orientation. Likewise, the orientation of the solar generators 12 may be carried out, if it depends only on the offset angle θ, after the axis $D_H$ has been estimated, before, during or after the placement of the satellite 10 in the intermediate orientation.

Consequently, the solar generators 12 may start to provide electrical power before having started reducing the angular momentum of the satellite 10. By virtue of the intermediate orientation of the satellite 10 (in which the axis Y is substantially orthogonal to the axis $D_H$), it is possible to ensure an average insolation of the sensitive surfaces of the solar generators 12 of at least 30% over the period of one full rotation of the satellite 10 on itself. Such average insolation is sufficient to ensure electrical autonomy of the satellite 10 over time, and throughout the initial Sun acquisition phase. It is consequently possible to use electrical actuators, in particular electrical thrusters, in order subsequently to reduce the angular momentum of the satellite 10. Optionally, the electrical actuators may be activated discontinuously, in order to be able to recharge the batteries of the satellite 10 between two successive activations of said electrical actuators, when said electrical actuators are deactivated.

This is made possible by deployment of the solar generators 12 before reducing the angular momentum of the satellite 10. The solar generators 12 may be fully deployed, or may be deployed only partially, in particular if the initial angular momentum is very high. In the case in which the solar generators 12 are only partially deployed, they may for example be deployed progressively as the angular momentum of the satellite 10 decreases, or they may be deployed fully after the angular momentum of the satellite 10 has been reduced. If the initial angular momentum is too high, it may be envisioned to carry out partial reduction of the angular momentum before having deployed the solar generators 12 (optionally up to the limit of the capacity of the batteries of the satellite 10). The essential part of the reduction of the angular momentum, however, is carried out after at least partial deployment of said solar generators 12, the electrical autonomy of said satellite 10 then being ensured.

Reduction of the Angular Momentum of the Satellite

Next, actuators of the satellite 10 are used in order to reduce the angular momentum of the satellite 10. "Reduce the angular momentum" of the satellite 10 is intended to mean reducing the modulus of said angular momentum, preferably until a predefined threshold value is reached. The reduction of the angular momentum of the satellite 10 is preferably carried out while keeping said satellite 10 in the intermediate orientation, that is to say while keeping the axis Y substantially orthogonal to the axis $D_H$ of the angular momentum. The controlling of the actuators of the satellite 10 in order to reduce the angular momentum of the satellite 10 may be carried out in a conventional way.

As indicated above, the electrical autonomy of the satellite 10 is ensured by placement of said satellite 10 in the intermediate orientation and by at least partial deployment of the solar generators 12.

In one preferred embodiment, the reduction of the angular momentum of the satellite 10 placed in the intermediate orientation uses electrical (plasma) thrusters of said satellite 10. Specifically, electrical autonomy of the satellite 10 being ensured, the electrical thrusters may be used despite the drawbacks mentioned above (unavailability for the first days, low torque capacity, high electrical consumption). There is, however, nothing to exclude using other actuators of the satellite 10 in order to reduce the angular momentum of the satellite 10, as a supplement or as an alternative to the electrical thrusters. In the case of a satellite 10 in an LEO orbit, for example, it is possible to use magnetic torquers. According to another example, it is possible to use chemical thrusters, which may have a torque capacity lower than those used in the prior art insofar as, the electrical autonomy of the satellite 10 being ensured, it is no longer necessary to place the satellite 10 in the acquisition orientation rapidly.

The reduction of the angular momentum is preferably carried out without modifying the axis $D_H$ of the angular momentum. There is, however, nothing to exclude also modifying the axis $D_H$, for example in order to start to place the satellite 10 in the acquisition orientation. In such a case, if the axis $D_H$ varies significantly, it is then advantageous to update the intermediate orientation of the satellite 10 in order to follow the variations of the axis $D_H$, and if necessary the orientation of the solar generators 12.

Placement of the Satellite in the Acquisition Orientation

Simultaneously with and/or after the reduction of the angular momentum, the satellite 10 is placed in the acquisition orientation, with respect to the Sun, in which the axis Y of the solar generators 12 is substantially orthogonal to the direction $D_S$ of the Sun with respect to the satellite 10.

In the rest of the description, without limitation, the case will be assumed in which the placement of the satellite 10 in the acquisition orientation corresponds to stabilization of the attitude of the satellite 10 along three axes.

According to other examples, however, there is nothing to exclude having a nonzero rotational speed of the satellite 10 in the acquisition orientation. Optionally, the axis $D_H$ of the angular momentum is modified so as to be made substantially parallel to the direction $D_S$ of the Sun with respect to the satellite 10 while keeping the axis Y substantially orthogonal to the axis $D_H$, so that the axis Y is substantially orthogonal to the direction $D_S$ of the Sun throughout the period of the rotation of the satellite 10 on itself.

The placement of the satellite 10 in the acquisition orientation may use any suitable type of actuator. The electrical autonomy of the satellite 10 over time being ensured, the placement of the satellite 10 in the acquisition orientation preferably uses electrical actuators. The actuators used may be the same as those used to reduce the angular momentum of the satellite 10, or they may be different actuators.

In one preferred embodiment, the placement of the satellite 10 in the acquisition orientation uses inertial actuators of said satellite 10, preferably gyroscopic actuators and/or reaction wheels of the satellite 10. The controlling of the inertial actuators of the satellite 10 in order to place said satellite 10 in the acquisition orientation may be carried out in a conventional way. For example, the inertial actuators may be used when the modulus of the angular momentum of said satellite 10 becomes less than a predefined threshold value, which is equal to or less than the capacity of said inertial actuators.

When the satellite 10 is in the acquisition orientation, the solar generators 12 are preferably oriented in such a way that the rays of the Sun have substantially normal incidence on the photosensitive surfaces of the solar generators, in order to maximize the electrical power generated.

Figure 4:
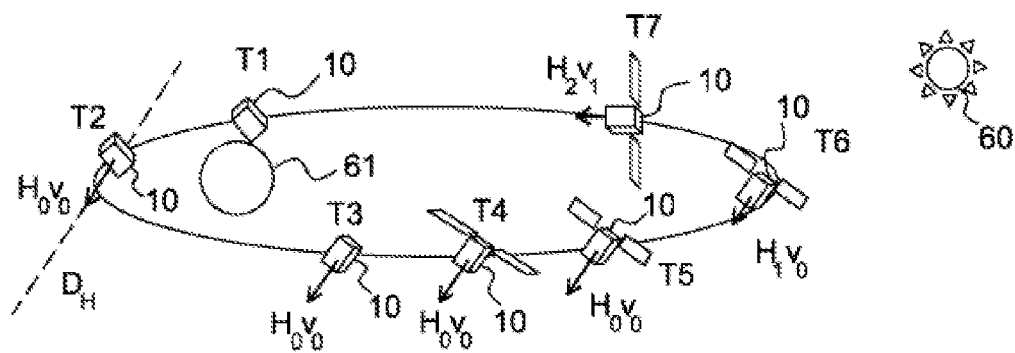
FIG. 4 represents a schematic representation of an exemplary embodiment of a Sun acquisition phase.

FIG. 4 schematically represents a nonlimiting exemplary embodiment of an initial phase of acquisition of the Sun 60 according to the invention:
- at time T1: the satellite 10 has just been separated from the launcher with an inertial angular momentum equal to $H_0 \cdot v_0$, in which expression $v_0$ is a unit vector of the axis $D_H$ at time T1 and $H_0$ is the modulus of the angular momentum at time T1,
- at time T2: the angular momentum $H_0 \cdot v_0$ has been estimated by means of sensors of the satellite 10,
- at time T3: the satellite 10 has been placed in the intermediate orientation, with an angular momentum still equal to $H_0 \cdot v_0$,
- at time T4: the solar generators 12 of the satellite 10 have been deployed (fully deployed in the nonlimiting example illustrated by FIG. 4),
- at time T5: the solar generators 12 have been oriented toward the Sun 60, the photosensitive surfaces being substantially parallel to the axis $D_H$ in the example represented,
- at time T6: the angular momentum has been reduced with a constant axis $D_H$, so that the angular momentum is equal to $H_1 \cdot v_0$, in which expression $H_1 < H_0$ is the modulus of the angular momentum at time T6,
- at time T7: the satellite 10 has been placed in the acquisition orientation while continuing to reduce the angular momentum, and the axis $D_H$ now passes substantially through the Sun 60 and the angular momentum is equal to $H_2 \cdot v_1$, in which expression $H_2 < H_1$ is the modulus of the angular momentum at time T7 and $v_1$ is a unit vector of the axis $D_H$ at time T7.

More generally, it should be noted that the embodiments considered above have been described by way of nonlimiting examples, and that other variants may consequently be envisioned.

In particular, the invention has been described by considering an initial Sun acquisition phase. As indicated above, the invention is also applicable to other Sun acquisition phases. In particular, the invention is applicable to the Sun acquisition phase in survival mode, for which the comments above remain valid except that the solar generators 12 of the satellite 10 are then already deployed before the start of the Sun acquisition phase in survival mode.

Furthermore, a method 50 for controlling an acquisition phase according to the invention may be combined with other control methods. In particular, a control method 50 according to the invention may be used only if the initial angular momentum is very high. Thus, assuming that only electrical actuators are used, the control of the acquisition phase may be adapted as a function of the initial angular momentum:
- if the initial angular momentum is within the capacity of the inertial actuators of the satellite 10: the inertial actuators are used in order to reduce the angular momentum of said satellite 10,
- if the initial angular momentum is not within the capacity of the inertial actuators but is within the combined capacity of the electrical thrusters and the batteries of the satellite 10: the electrical thrusters are used in order to reduce the angular momentum of said satellite 10,
- if the initial angular momentum is not within the capacity of the inertial actuators and is not within the combined capacity of the electrical thrusters and the batteries of the satellite 10: a control method 50 according to the invention is then carried out.

The description above clearly illustrates that, by its various characteristics and their advantages, the present invention achieves the objects which were required of it. In particular, because the electrical autonomy of the satellite 10 is ensured by placing said satellite 10 in the intermediate orientation and by orienting the solar generators 12 in a suitable way, the Sun acquisition phase may use only electrical actuators. Consequently, the proposed solution is applicable particularly in the case of a satellite which does not have any chemical thrusters.

The invention claimed is:

1. A method for controlling a phase of acquisition of the sun by a spacecraft with a nonzero angular momentum of an axis $D_H$, the spacecraft comprises a body, a solar generator and a drive mechanism to drive the solar generator in rotation about an axis Y, the method comprising the steps of:
   controlling actuators of the spacecraft to place the spacecraft in an intermediate orientation with respect to the angular momentum, in which the axis Y is substantially orthogonal to the axis $D_H$ of the angular momentum;

controlling the drive mechanism of the solar generator, at least partially deployed beforehand, to orientate the solar generator toward the sun;

after the spacecraft has been placed in the intermediate orientation and after the solar generator has been oriented toward the sun, the method further comprises the steps of:

controlling the actuators of the spacecraft to reduce the angular momentum of the spacecraft; and controlling the actuators of the spacecraft to place the spacecraft in an acquisition orientation with respect to the sun, in which the axis Y is substantially orthogonal to the direction of the sun with respect to the spacecraft.

2. The method as claimed in claim 1, wherein the reduction of the angular momentum of the spacecraft placed in the intermediate orientation uses electrical thrusters of the spacecraft.

3. The method as claimed in claim 1, further comprising the step of utilizing only electrical actuators of the spacecraft during the acquisition phase of the sun.

4. The method as claimed in claim 1, further comprising the steps of deploying the solar generator of the spacecraft such that an axis of maximum inertia of the spacecraft is orthogonal to the axis Y; at least partially deploying the solar generator prior to the placement of the spacecraft in the intermediate orientation; and performing nutation damping during the placement of the spacecraft in the intermediate orientation.

5. The method as claimed in claim 1, wherein an axis of minimum inertia of the spacecraft is orthogonal to the axis Y; and further comprising the step of performing nutation control to align the axis of minimum inertia of the satellite with the axis $D_H$ of the angular momentum during the placement of the spacecraft in the intermediate orientation.

6. The method as claimed in claim 1, further comprising the steps of remotely controlling the acquisition phase of the sun by a control device; and successively determining and transmitting control signals to the spacecraft by said control device.

7. The method as claimed in claim 1, wherein the placement of the spacecraft in the intermediate orientation uses inertial actuators of the spacecraft.

8. The method as claimed in claim 7, wherein the placement of the spacecraft in the intermediate orientation uses at least one of the following inertial actuators of the spacecraft: gyroscopic actuators and reaction wheels.

9. The method as claimed in claim 1, wherein the placement of the spacecraft in the acquisition orientation uses inertial actuators of the spacecraft.

10. The method as claimed in claim 9, wherein the placement of the spacecraft in the acquisition orientation uses at least one of the following inertial actuators of the spacecraft: gyroscopic actuators and reaction wheels.

11. The method as claimed in claim 9, further comprising the step of utilizing the inertial actuators to place the spacecraft in the acquisition orientation in response to a determination that the angular momentum of the spacecraft is less than a predefined threshold value.

12. The method as claimed claim 1, further comprising the step of determining the orientation of the solar generator during the reduction of the angular momentum as a function of an offset angle θ between the direction of the Sun and the axis $D_H$ of the angular momentum.

13. The method as claimed in claim 12, further comprising the step of maintaining the orientation of the solar generator fixed with respect to the body of the spacecraft during the reduction of the angular momentum.

14. The method as claimed in claim 13, further comprising the step of maintaining the solar generator during the reduction of the angular momentum such that a photosensitive surface of the solar generator is substantially parallel to the axis $D_H$ of the angular momentum when $|\cos \theta| < V_{S1}$, $V_{S1}$ is a predefined threshold value, and the photosensitive surface is substantially orthogonal to the axis $D_H$ when $|\cos \theta| > V_{S1}$, the photosensitive surface being oriented toward a side facing the sun.

15. The method as claimed in claim 13, wherein the spacecraft comprises two solar generators mounted on respective drive mechanisms configured to rotate said solar generators about respective parallel axes Y; and further comprising the step of maintaining said solar generators during the reduction of the angular momentum such that respective photosensitive surfaces of said solar generators are substantially parallel to the axis $D_H$ of the angular momentum and with opposite respective pointing directions when $|\cos \theta| < V_{S2}$, $V_{S2}$ is a predefined threshold value.

16. A non-transitory computer readable storage medium comprising a set of program code instructions to control a phase of acquisition of the sun by a spacecraft with a nonzero angular momentum of an axis $D_H$, the spacecraft comprises a body, a solar generator and a drive mechanism to drive the solar generator in rotation about an axis Y, the set of program code instructions executed by a processor causes the processor to:

control actuators of the spacecraft to place the spacecraft in an intermediate orientation with respect to the angular momentum, in which the axis Y is substantially orthogonal to the axis $D_H$ of the angular momentum;

control the drive mechanism of the solar generator, at least partially deployed beforehand, to orientate the solar generator toward the sun;

after the spacecraft has been placed in the intermediate orientation and after the solar generator has been oriented toward the sun, the set of program code instructions executed by the processor causes the processor to:

control the actuators of the spacecraft to reduce the angular momentum of the spacecraft; and control the actuators of the spacecraft to place the spacecraft in an acquisition orientation with respect to the sun, in which the axis Y is substantially orthogonal to the direction of the sun with respect to the spacecraft.

17. A controller to control a phase of acquisition of the sun by a spacecraft with a nonzero angular momentum of axis $D_H$, the spacecraft comprising a body, actuators, a solar generator and a drive mechanism to drive the solar generator in rotation about an axis Y, the controller is configured to:

control actuators of the spacecraft to place the spacecraft in an intermediate orientation with respect to the angular momentum, in which the axis Y is substantially orthogonal to the axis $D_H$ of the angular momentum;

control the drive mechanism of the solar generator, at least partially deployed beforehand, to orientate the solar generator toward the sun; and after the spacecraft has been placed in the intermediate orientation and after the solar generator has been oriented toward the sun, the controller is configured to control the actuators of the spacecraft to reduce the angular momentum of the spacecraft, and to control the actuators of the spacecraft to place the spacecraft in an acquisition orientation with respect to the sun, in which the axis Y is substantially orthogonal to the direction of the sun with respect to the spacecraft.

18. A space system comprising a spacecraft comprising a body, actuators, a solar generator and a drive mechanism to drive the solar generator in rotation about an axis Y, the space system comprises the controller as claimed in claim 17 to control the phase of acquisition of the sun by the spacecraft.

* * * * *